G. A. JOHNSON.
FRICTION SHOCK ABSORBING MECHANISM.
APPLICATION FILED MAR. 4, 1918.
1,290,216.
Patented Jan. 7, 1919.
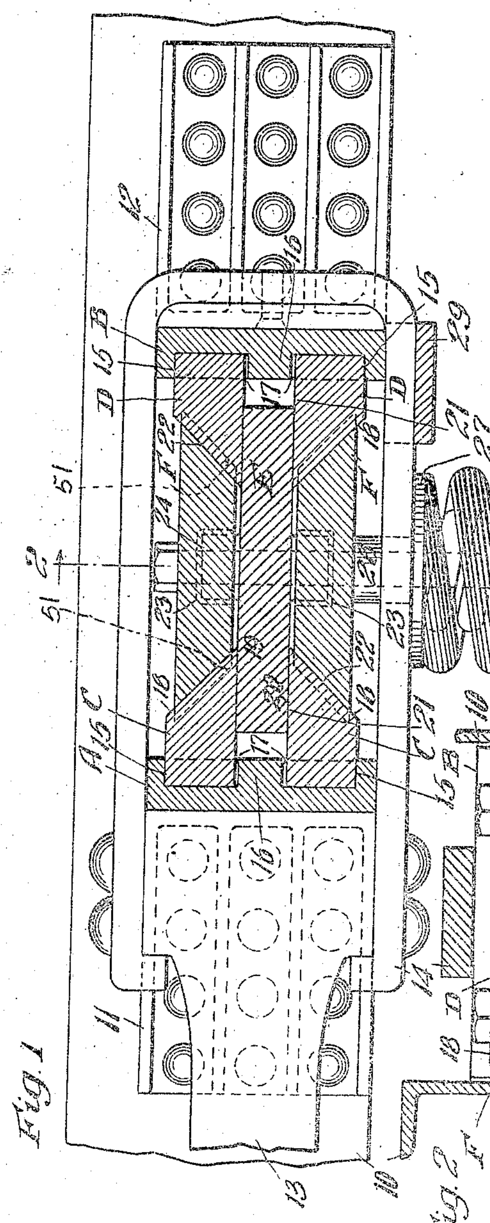
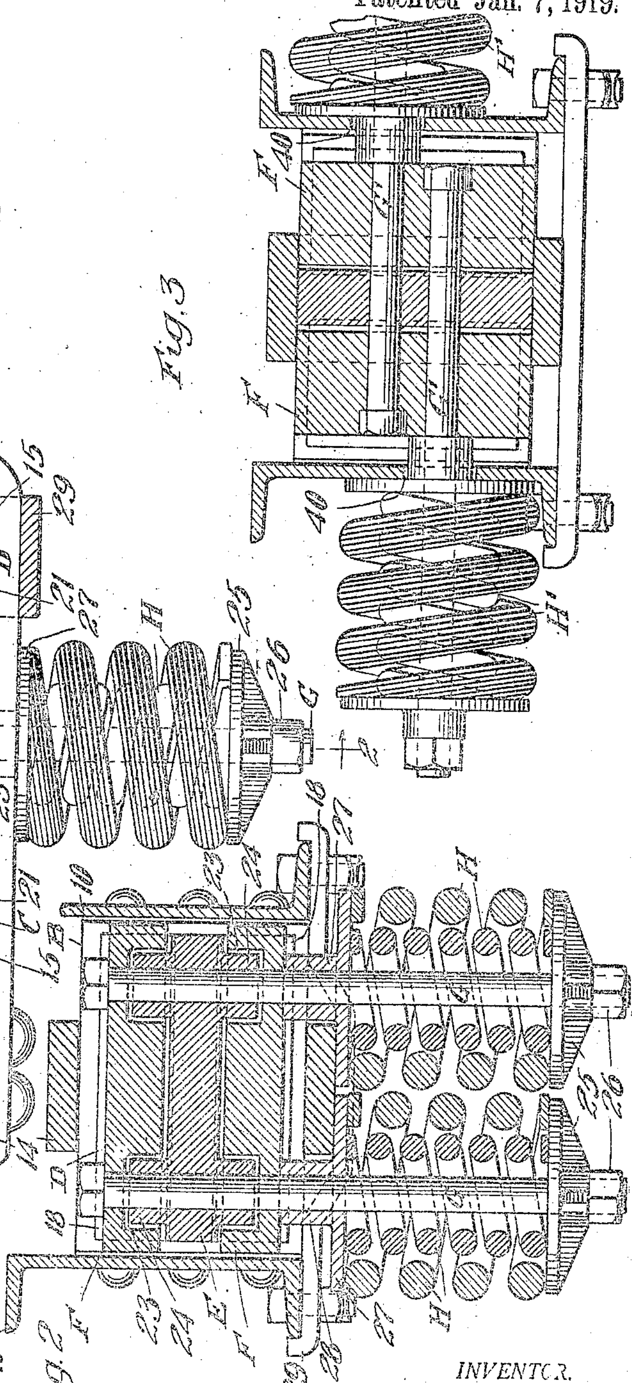
INVENTOR.
George A. Johnson
BY Geo. I. Haight
ATTORNEY

UNITED STATES PATENT OFFICE.

GEORGE A. JOHNSON, OF CHICAGO, ILLINOIS, ASSIGNOR TO WILLIAM H. MINER, OF CHAZY, NEW YORK.

FRICTION SHOCK-ABSORBING MECHANISM.

1,290,216. Specification of Letters Patent. Patented Jan. 7, 1919.

Application filed March 4, 1918. Serial No. 220,245.

*To all whom it may concern:*

Be it known that I, GEORGE A. JOHNSON, a citizen of the United States, residing at Chicago, in the county of Cook and State of Illinois, have invented a certain new and useful Improvement in Friction Shock-Absorbing Mechanism, of which the following is a full, clear, concise, and exact description, reference being had to the accompanying drawings, forming a part of this specification.

This invention relates to improvements in friction shock absorbing mechanism.

One object of the invention is to provide a friction shock absorbing mechanism, especially adapted for railway draft riggings, which can be cheaply manufactured, is provided with large friction wearing areas and is of high capacity.

Another and more specific object of the invention is to provide a friction shock absorbing mechanism of the type above indicated wherein all the friction elements can be cheaply manufactured in the form of castings.

In the drawing forming a part of this specification, Figure 1 is a part side elevation, part longitudinal, vertical, sectional view of a portion of a railway draft rigging showing my improvements attached thereto. Fig. 2 is a transverse, vertical, sectional view, taken substantially on the line 2—2 of Fig. 1. And Fig. 3 is a view corresponding to Fig. 2, but illustrating another embodiment of the invention where the parts have been turned through an angle of 90°. In the structure shown in Figs. 1 and 2, the springs are extended vertically below the sills, whereas in Fig. 3 the springs are placed on the outside of the sills and extend horizontally.

In said drawings, 10—10 denote channel-shaped center or draft sills of a railway car to the inner faces of which are secured the usual front and rear stops 11 and 12. The draw bar 13 is adapted to be operatively connected with the shock absorbing mechanism proper by any suitable means, such as the yoke 14.

The shock absorbing mechanism, as shown, includes a front follower A, rear follower B, a pair of front wedges C—C, a pair of rear wedges D—D, a central friction member E, upper and lower friction members F—F, a pair of vertically extending bolts G—G and a pair of springs H—H.

Each follower A and B is of substantially rectangular form as customary, and on its inner face is provided with upper and lower transversely extending recesses or pockets 15—15 to loosely receive the outer ends of the correspondingly shaped wedges C—C and D—D. It will be noted that there is a slight clearance left between the wedges and the transversely extending ribs 16—16 of the followers, as indicated at 17, the purpose of this clearance being to permit any slight adjustment that may be necessary due to inequalities of manufacturing of the wedges and followers.

All of the wedges C—C and D—D extend transversely of the shock absorbing mechanism and the same are provided on their inner ends with beveled or wedge faces 18—18, the wedge faces of the blocks C—C being oppositely arranged and the same being true with the wedge faces of the wedges D—D.

The central friction member E is of substantially rectangular form and is provided with upper and lower horizontal friction faces 19 and 20 coöperable with the opposed horizontal friction faces 21—21 of the wedges C—C and D—D. The vertical thickness of the central friction member E is made slightly greater than the vertical height of the follower ribs 16—16 so as to always insure proper contact between the friction faces of the wedges C—C and D—D and the central friction member E.

Each of the outer or side friction members F—F has its ends beveled or wedge-shaped, as indicated at 22—22, so as to coöperate with the opposed wedge faces 18—18 of the wedges C—C and D—D.

In order to always maintain proper relation of the parts, the friction members F—F are preferably provided with sockets 23—23 in which are seated upwardly and downwardly extended bosses 24—24 on the central friction member E. In this manner, it is evident that relative longitudinal movement between the friction members E—E and F—F is prevented except, of course, for the slight clearance in the interfitting parts.

Furthermore, the members F—F are provided at their ends with flanges, as indicated at 51—51 in Fig. 1, overlapping the sides of the wedges C—C and D—D so as to prevent relative lateral movement between said members.

Each of the bolts G—G is extended through alined perforations in the friction members E—E and F—F at either side of the arms of the yoke 14. At their lower ends, the bolts G are provided with spring followers 25 which are retained by the nuts 26, said followers 25 forming the lower bearings for the springs H—H. Also mounted on the bolts G and against which the upper ends of the springs H bear, are slidable followers 27, the same having sleeves 28—28 extended up past the lower arm of the yoke 14 and bearing against the under side of the lower friction member F.

To properly support the gear any suitable means may be used, as for instance, the saddle plate 29 which is detachably bolted to the lower flanges of the draft sill.

In operation, it is apparent that as the followers A and B are made to approach each other under either buff or draft, the wedges C—C and D—D will also approach each other, thereby forcing the friction members F—F away from each other. This relative separating movement of the friction members F—F is resisted by the springs H—H through the bolts G, as will be understood. In this connection, it may be observed that the amount of compression of the springs H will be double the movement of either of the friction members F since each spring H is simultaneously compressed from both ends, that is, the spring followers 25 and 27 are each moved and toward each other. In addition to the friction created between the friction members F—F and the wedges C—C and D—D, it is evident that a large frictional area is obtained between the sliding horizontal contacting faces of the central friction member E and the wedges C—C and D—D. It will also be observed that relative movement between the central member E and all of the wedges C—C and D—D is obtained simultaneously for the reason that, as the friction members F—F are separated, they are simultaneously moved longitudinally and will consequently carry the central friction member E therewith and the reverse action will occur during the release.

In the construction shown in Fig. 3, the arrangement of friction elements, followers, etc., is the same as that shown in Figs. 1 and 2 except that the parts are turned 90° and the off-center friction members F—F, instead of being separated in vertical direction, will be separated in a horizontal direction. In this construction, the spring retaining bolts G′—G′ are preferably vertically offset, as clearly shown in Fig. 3, said bolts G′—G′ being extended through suitable perforations 40—40 in the draft sills and the springs H′—H′ located outside of the sills.

From the preceding description, it will be seen that I obtain a friction gear of high capacity having large frictional wearing areas and at the same time, all of the friction elements may be inexpensively manufactured in the form of castings without the necessity of machining or drop forging. The arrangement is also compact and may be utilized in the shortest gear space now permitted on railway cars; the use of friction shells is eliminated; and any common form of attachments may be used in combination with the shock absorbing mechanism proper.

Although I have herein shown and described what I now consider the preferred manner of carrying out the invention, the same is merely illustrative and I contemplate all changes and modifications that come within the scope of the claims appended hereto.

I claim:

1. In a friction shock absorbing mechanism, the combination with end followers movable relatively toward each other; of end wedges movable with the respective followers; central and side friction members frictionally engaging with said wedges, said side friction members being relatively separable and at right angles to the line of movement of said followers, the central friction member and the wedges being restricted to relative rectilinear movement; and spring means resisting the separating movements of said side friction members.

2. In a friction shock absorbing mechanism, the combination with a pair of followers relatively movable toward each other; of wedges movable with the respective followers; a central friction member, said central friction member and said wedges having coöperating friction surfaces extending parallel to the axis of the shock absorbing mechanism; additional friction members on either side of said central friction member and having frictional engagement with said wedges; said side friction members being relatively separable; and spring means for resisting separating movement of said side friction members.

3. In a friction draft rigging for railway cars, the combination with a draw bar and yoke acting means associated therewith, of shock absorbing mechanism operatively associated with the draw bar and yoke acting means, said mechanism including a plurality of wedges at each end thereof and movable parallel to the axis of the draft rigging, central and lateral friction members frictionally engaging with said end wedges, said lateral friction members being relatively separable at right angles to the center line of the draft rigging, said central friction member and end wedges having coöperable friction faces extending parallel to the center line of the draft rigging, and spring means resisting said separating movement of the lateral friction members.

4. In a friction shock absorbing mechanism, the combination with end followers movable relatively toward each other, of end wedges movable with the respective followers; central and side friction members frictionally engaging with said wedges, said side friction members being relatively separable and at right angles to the line of movement of said followers, the central friction member and the wedges being restricted to relative rectilinear movement; and spring means resisting the separating movements of said side friction members, said central friction member being longitudinally movable.

5. In a railway draft rigging, the combination with a draw bar and yoke acting means, of a friction shock absorbing mechanism operatively associated with said draw bar and yoke acting means, said mechanism including end wedges arranged to be actuated upon movement of the draw bar and yoke acting means, central and side friction members frictionally engaging with said wedges, said side friction members being relatively separable and at right angles to the line of movement of said draw bar and yoke acting means, the central friction member and said end wedges having rectilineal movement only parallel to the center line of the draft rigging, and spring means resisting the separating movements of said side friction members.

6. In a friction shock absorbing mechanism, the combination with end followers movable relatively toward each other; of a pair of inwardly extending wedges on each of said followers, said wedges being spaced; a central friction member having the ends thereof extended into the spaces between said wedges and frictionally engaging the latter, the engaging friction faces of said wedges and central friction member extending parallel to the center line of the mechanism, friction members on either side of said central friction member and having wedge-shaped ends coöperable with said wedges; and spring means for resisting movement of said side friction members upon relative approach of the followers.

7. In a friction shock absorbing mechanism, the combination with end followers movable relatively toward each other; of a pair of inwardly extending wedges on each of said followers, said wedges being spaced; a central friction member having the ends thereof extended into the spaces between said wedges and frictionally engaging the latter, friction members on either side of said central friction member and having wedge-shaped ends coöperable with said wedges; and spring means for resisting movement of said side friction members upon relative approach of the followers, said central friction member being longitudinally movable and the engaging friction surfaces of said central member and the wedges extending parallel to the axis of the mechanism.

8. In a friction shock absorbing mechanism, the combination with a pair of wedges at each end of the mechanism, the wedges of each member being spaced and provided with center friction faces extending parallel to the center line of the mechanism and with inwardly inclined friction wedge faces at their inner ends; of side friction members having wedge shaped ends coöperable with said inclined friction wedge faces of the end wedges, said side friction members being separated upon relative approach of said end wedges; centrally disposed friction means having the end portions thereof provided with friction faces extending parallel to the center line of the mechanism, said end portions being disposed between and coöperating with the parallel friction surfaces of the end wedges, and spring means for resisting relative separation of said side friction members.

9. In a draft rigging for railway cars, the combination with a draw bar and yoke acting means, of a friction shock absorbing mechanism associated with said draw bar and yoke acting means, said mechanism including end sets of wedges, the wedges of each set being spaced and said wedges having movement only in lines parallel to the center line of the draft rigging and actuated by the draw bar and yoke acting means, a central friction member having its ends interposed between said end wedges and frictionally coöperating therewith, of side friction members having wedge shaped ends coöperable with the end wedges, the side members being separated upon relative approach of said end sets of wedges, coöperating projections and recesses on said central friction member and side friction members to thereby prevent relative movement between said members parallel to the center line of the draft rigging, and spring means for resisting separating movement of said side friction members.

10. In a draft rigging for railway cars, the combination with draft sills, a draw bar, and yoke-acting means; of a friction shock absorbing mechanism including front and rear followers, a pair of wedges loosely seated on each of said followers and extended inwardly, the members of each pair being vertically spaced, a central friction member longitudinally slidable and frictionally engaging said wedges, upper and lower side friction members having beveled ends cooperable with said wedges, a pair of bolts extended vertically through all of said friction members, and springs carried by said bolts to resist relative separation between the said side friction members, the central and side friction members having interengaging portions adapting the said friction members to move longitudinally in unison.

11. In a friction shock absorbing mechanism, the combination with a pair of end followers movable relatively toward each other; of a pair of wedges extending inwardly from each of said followers, said wedges being separable from the followers and the wedges and followers having coöperating means to maintain proper relation therebetween; of a central friction member having friction faces on opposite sides thereof extending parallel to the line of relative movement between the followers, said central friction member being mounted between the sets of wedges and frictionally coöperating with the latter; friction members on either side of said central friction member and having wedge-shaped ends coöperable with said wedges; and spring means for resisting relative approach of said followers and acting through said friction members at the sides of said central friction member.

12. In a friction shock absorbing mechanism, the combination with relatively movable end followers, of a pair of spaced detachable wedges mounted on the inner face of each of said followers, said wedges having inclined outer wedge faces and inner friction faces parallel to the line of relative movement of said followers, outer friction members having inclined ends frictionally coöperable with said wedges and adapted to be separated upon relative approach of said followers, central friction means having friction surfaces parallel to said inner friction faces of the wedges and coöperable therewith, and spring means for resisting said separating movement of said outer friction members.

13. In a railway draft rigging, the combination with draft sills, a draw bar and yoke-acting means, of front and rear followers, a pair of wedges detachably mounted on the inner face of each of said followers, said wedges being spaced on each follower and provided with friction surfaces on their inner faces extending parallel to the center line of the gear, outer friction members coöperable with said wedges, the outer friction members being separable in lines at right angles to the axis of the gear upon relative approach of said followers, central friction means having friction faces also parallel to the axis of the gear and coöperable with the inner faces of said wedges, and spring means for resisting said separating movement of the outer friction members.

In witness that I claim the foregoing I have hereunto subscribed my name this 16th day of Feb. 1918.

GEORGE A. JOHNSON.